Figure 1:
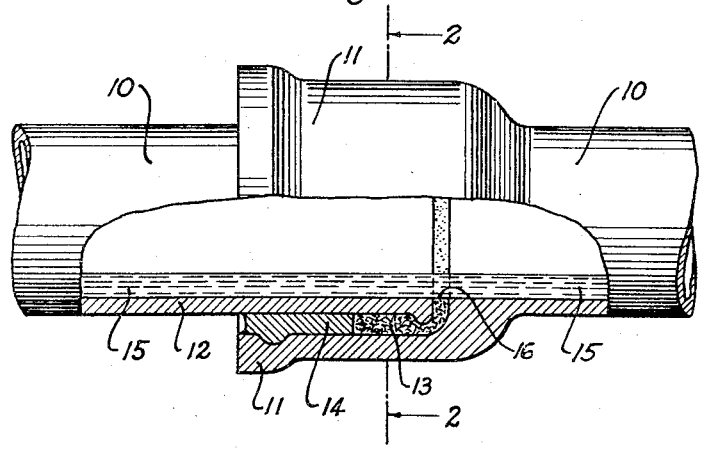

July 25, 1939.　　D. B. WILLIAMS　　2,167,141

TREATMENT OF GAS DISTRIBUTION SYSTEMS

Filed May 18, 1938

Duncan B Williams
INVENTOR.

BY Hugo G. Kennan
ATTORNEY.

Patented July 25, 1939

2,167,141

UNITED STATES PATENT OFFICE 2,167,141

TREATMENT OF GAS DISTRIBUTION SYSTEMS

Duncan B. Williams, Glen Ridge, N. J., assignor to The United Gas Improvement Company, a corporation of Pennsylvania Application May 18, 1938, Serial No. 208,729

7 Claims. (Cl. 48—190)

This application is a continuation in part of my copending application Serial Number 673,618 filed May 31, 1933, now Patent 2,094,691, issued October 5, 1937, and pertains generally to the treatment of the interiors of gas mains or other gas conduits for the purpose, among other things, of laying dust.

Systems for the distribution of gas generally consist of conduits or mains usually laid underground. Until recently when welded joints have come into more common use, these conduits were constructed of sections of pipe, usually of cast iron, joined by means of bell and spigot or other joints, packed with hemp, jute, flax or other cellulosic material, and sealed with lead or cement in a well-known manner.

Manufactured gas for a long period of years has been produced for the most part locally, that is, in or near the cities to be supplied, and until recently no special effort has been made to recover condensible materials from the gas prior to its delivery to the mains.

Since the gas during its manufacture is passed through the wash box and purifying apparatus containing large quantities of moisture, it is upon delivery to the mains more or less saturated with water and is generally referred to as being wet.

The lower temperatures of the mains, particularly during cool weather, causes considerable condensation of water as well as other materials known generally as "drip oil".

Over a period of years this condensed water, together with other constituents of the gas, such as carbon dioxide, hydrogen sulfide, hydrocyanic acid, naphthalene, etc., has caused extensive corrosion of the interior walls of the mains. The products of corrosion have built up on the walls of the mains and in many instances large quantities have become disconnected and have collected along the bottom.

Due to the presence of the relatively large quantities of moisture responsible for the corrosion in the first instance, the products of corrosion were maintained in a wet condition and did not tend to form dust in any appreciable quantity.

Therefore, until high pressure distribution came into practice and while the use of natural gas, or natural gas mixtures, was less widespread, very little difficulty was experienced with the formation of dust in the mains from the products of corrosion. In fact, traps or "drips" were installed at low points in the mains to catch condensed hydrocarbons, known collectively as "drip oil" as well as the condensed water.

However, when manufactured gas is compressed to obtain a sufficiently high pressure for delivery in large quantities at distant points, considerable quantities of moisture (which term is used collectively for all condensible materials) are condensed out. When this gas is re-expanded at its destination for local distribution, its relative moisture content is low and the gas is referred to as being "dry". There is then no longer sufficient moisture in the gas to keep the products of corrosion wetted down. On the contrary, the gas is so dry that it will draw out any remaining moisture in and on the corrosion products.

In other words, as long as the main is used for distributing ordinary moist manufactured gas, very little trouble with dust resulting from corrosion is experienced. However, when the service is changed over to a manufactured gas of low moisture content, or over to natural gas which is characterized by a very low moisture content, the moisture on and in the corrosion products dries out, and such products become a serious source of dust.

The presence of considerable quantities of dust in the gas flowing through the mains of a distribution system is very undesirable because dust tends to clog up customers' service connections, interferes with the proper operation of meters and tends to clog up burners and pilot outlets.

Under extreme conditions corrosion may be so severe as to form a serious obstruction in the main itself by reducing its effective cross sectional area, or by accumulation of dust in piles in the main.

A number of methods of correcting dust troubles have been proposed and used.

For instance, excavations have been made at suitably spaced points along the main, say every three hundred feet, the main severed at each excavation and the accumulations removed mechanically.

This has been done by dragging a ball of chain back and forth through the disconnected section and increasing the size of the ball as more and more of the products of corrosion have been removed. In some instances a cutter has been substituted for the ball of chain.

In another method a compressor is converted to function as a suction device for sucking air through the disconnected main section and the dust is collected in a bag, in a manner customary in the operation of the ordinary vacuum cleaner.

It will be appreciated that either of the foregoing methods is very expensive in view of the immense amount of labor involved. Furthermore, both methods put the main out of service during the treatment.

Steam has been introduced into the main while in service but this method has the disadvantage that the deposited moisture dries out as soon as steaming is stopped. As far as I am aware, the same applies to the fogging of oil into the mains, since the oil which it has been necessary to use for successful fogging has had to be so light as to make it appreciably volatile.

Furthermore, since the corrosion products comprise not only ordinary iron rust but also a variety of other compounds resulting from the activity of hydrogen sulfide, hydrocyanic acid, naphthalene and other corrosive substances, the problem of wetting down the dust, of wetting the main wall and of thoroughly spreading a dust laying liquid becomes a major factor.

I have discovered that certain classes of liquids generally, and certain liquids within those classes more particularly, are excellently adapted as dust laying agents for treatment of gas conduits, and that gas conduits treated with such liquids are maintained dormant as sources of dust for very long periods of time, if not permanently.

Broadly, a liquid to be suitable for the purposes of my invention, should have certain properties.

The liquid should be substantially non-volatile; that is, it should have a relatively high boiling point and a low vapor pressure so that evaporation is negligible even when the main is used for conducting very dry gas.

The liquid should be chemically and physically inert with respect to the gas; that is, the gas should have substantially no affinity for the liquid.

The liquid should preferably be hygroscopic so that the presence of moisture will assist rather than resist thorough and complete wetting of the main wall and of the corrosion products by the liquid. In this connection, it is to be observed that liquids of the prior art such as "drip oil" or petroleum oil are non-hygroscopic in character, and are characterized by being completely non-miscible with water. Since it is a well recognized fact that when a solid is contacted with two immiscible liquids, one of the liquids will wet the solid to the exclusion of the other, and since this phenomenon has been shown to apply particularly to mineral oil and water, it will be seen that thorough and complete distribution of a mineral oil is not possible in the presence of even a trace of water. It will be recognized that the surfaces of corrosion products in the mains may become sufficiently dry to cause serious dust troubles without the entire mass losing its water content. Therefore, the importance of this property in my treating liquids cannot be overestimated.

The liquid preferably has good surface wetting properties with respect to both the products of corrosion and the uncorroded metal walls of the main. This will facilitate spreading of the liquid throughout the main and the body of corrosion products even when contact with the liquid is only over a small area, say along the bottom of the main.

A mixture of various liquids may be used.

In accordance with my invention liquids having the above-mentioned desirable properties may be classified as water miscible organic oils.

The lower monohydroxy alcohols and other volatile liquids which are good solvents may be used as solvents for less volatile, more viscous liquids falling within the group before enumerated to facilitate their application to the conduit walls and to the products of corrosion.

Water miscible organic oils include all animal and vegetable oils having the necessary properties. It does not include the hydrocarbon mineral oils such as the naphthene or paraffin base oils, unless sulfonated in which case they become water miscible, or any other oils consisting mainly of hydrocarbons. Examples of suitable organic oils are sulfonated corn oil, sulfonated lard oil, sulfonated cottonseed oil, sulfonated palm oil, Turkey red oil, sulfonated cocoanut oil, sulfonated castor oil, sulfonated sperm oil, and sulfonated cod liver oil.

The treating liquid may be applied to the interior surface of a pipe section before, during, or after its installation in the main or conduits in any desired manner, such as by spraying, brushing or otherwise.

If the main or conduit is already in service, sections of the conduit may be "blocked off" by means of inflated bags or other means, and the sections then completely filled with the liquid, after which the liquid can be drawn off and re-used. Also, the liquid may be sprayed into the gas by the fogging process already mentioned so that the corrosion products absorb the liquid from the gas stream and the liquid is deposited from the gas stream onto the walls of the conduit. In another method of application, the liquid is introduced into the main at high points and allowed to run by gravity to low points where the excess can be drawn off. Another method comprises inserting a long length of hose into the main with a spray at its end or with a plurality of sprays or openings distributed along its length, and pumping the treating liquid into the hose while withdrawing the hose either continuously or intermittently or otherwise, or while the hose remains stationary.

In the last three methods of application, service on the line need not be interrupted, and the entire deposit of corrosion products as well as the walls of the mains become coated with the treating liquid. The wetting qualities of the treating liquid cause it to spread and thoroughly wet every exposed surface. This wetting of finely divided materials cause them to be bound together in a mass which prevents them from rising in a dust regardless of the velocity of the gas travelling through the conduit. The clogging of mains, meters, regulators and appliances is thus effectively prevented.

The presence of water does not interfere with but actually assists the spreading of the treating liquid.

Figure 2:
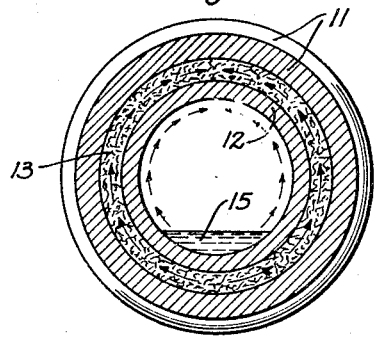

A typical gas conduit is illustrated in the drawing in which,

Figure 1 is a side elevation, partly in section, illustrating a gas conduit, and Figure 2 is a cross-section on line 2—2 of Figure 1.

In the drawing, the gas main 10 is shown with a joint comprising bell 11 and spigot 12 fitting within said bell and spaced therefrom. In the space between the bell and the spigot is packing 13 and a seal 14 of lead or other suitable material for holding the packing in place. The treating liquid 15 is run through the conduit by gravity. It contacts the inside of the conduit and any deposits along the bottom thereof. It also contacts with the packing at 16, which space is left between the spigot and the shoulder of the bell to provide for expansion and contraction due to temperature changes. The packing 13, if absorbent tends to absorb the liquid at 16 and carry it up by capillary action as shown by the outer group of arrows in Figure 2, helped by the walls of the bell and the spigot. The treating liquid, due to its wetting action, also tends to climb up the metal walls of the conduit as illustrated by the inner group of arrows in Figure 2.

The main body of the treating liquid, of course, remains in the conduit only during the time that it is flowing from the point to introduction to the nearest drip.

Any other means for applying the liquid to the interior of the conduit may be employed. For instance, the level of the liquid 15 may be raised, or may be made to fill the entire main, if desired.

In the case of a welded joint the pipe ends are brought together and welded and no packing is employed.

As previously stated, the presence of water assists the wetting and spreading of the treating liquids. If desired, therefore, water may be employed to assist in the wetting and spreading of these liquids such as by first wetting with water, for instance, steaming, following by application of the treating liquid, or water may be added to the treating liquid, or otherwise employed in the treatment. The substantially universal and excellent wetting qualities of water are thus added to those of the treating liquids.

Other water miscible organic oils are as follows: sulphonated soy bean oil, sulphonated olive oil, sulphonated mineral oil, and sulphonated peanut oil.

Other organic oils suitable for dust laying are corn oil, lard oil, cottonseed oil, palm oil, cocoanut oil, castor oil, sperm oil, and cod liver oil.

It is to be understood that the above particular description is by way of illustration and that changes, omissions, additions, substitutions and/or modifications may be made within the scope of the claims without departing from the spirit of the invention which is intended to be limited only as required by the prior art.

This application is also a continuation in part of my copending application, Serial Number 167,316 filed October 4, 1937.

I claim:

1. A method for treating a gas conduit to lay dust, comprising coating dust sources within said conduit with a liquid comprising an organic oil of low volatility, said oil being miscible with water in substantial quantity and being substantially inert in gas conduit environment.

2. A method for treating the interior of a gas conduit to lay dust, comprising coating dust sources within said conduit with an organic oil selected from a group consisting of sulfonated corn oil, sulfonated lard oil, sulfonated cottonseed oil, sulfonated palm oil, Turkey red oil, sulfonated cocoanut oil, sulfonated castor oil, sulfonated sperm oil, sulfonated cod liver oil, sulfonated soy bean oil, sulfonated olive oil, sulfonated mineral oil and sulfonated peanut oil.

3. A gas conduit having interior dust sources wetted down by an organic oil of low volatility, said oil being miscible with water in substantial quantity and being substantially inert in gas conduit environment.

4. A gas conduit having its inner walls coated with an organic oil selected from a group consisting of sulfonated corn oil, sulfonated lard oil, sulfonated cottonseed oil, sulfonated palm oil, Turkey red oil, sulfonated cocoanut oil, sulfonated castor oil, sulfonated sperm oil, sulfonated cod liver oil, sulfonated soy bean oil, sulfonated olive oil, sulfonated mineral oil, and sulfonated peanut oil.

5. A method for treating the interior of a gas conduit to lay dust, comprising coating dust sources within said conduit with a mixture of organic oils selected from a group consisting of sulfonated corn oil, sulfonated lard oil, sulfonated cottonseed oil, sulfonated palm oil, Turkey red oil, sulfonated cocoanut oil, sulfonated castor oil, sulfonated sperm oil, sulfonated cod liver oil, sulfonated soy bean oil, sulfonated olive oil, sulfonated mineral oil, and sulfonated peanut oil.

6. A gas conduit having inner dust sources coated with a mixture of organic oils selected from a group consisting of sulfonated corn oil, sulfonated lard oil, sulfonated cottonseed oil, sulfonated palm oil, Turkey red oil, sulfonated cocoanut oil, sulfonated castor oil, sulfonated sperm oil, sulfonated cod liver oil, sulfonated soy bean oil, sulfonated olive oil, sulfonated mineral oil, and sulfonated peanut oil.

7. A method for treating a gas conduit to lay dust, comprising coating dust sources within said conduit with a liquid comprising a sulfonated organic oil of low volatility, said oil being miscible with water in substantial quantity and being substantially inert in gas conduit environment.

DUNCAN B. WILLIAMS.